Figure 1:
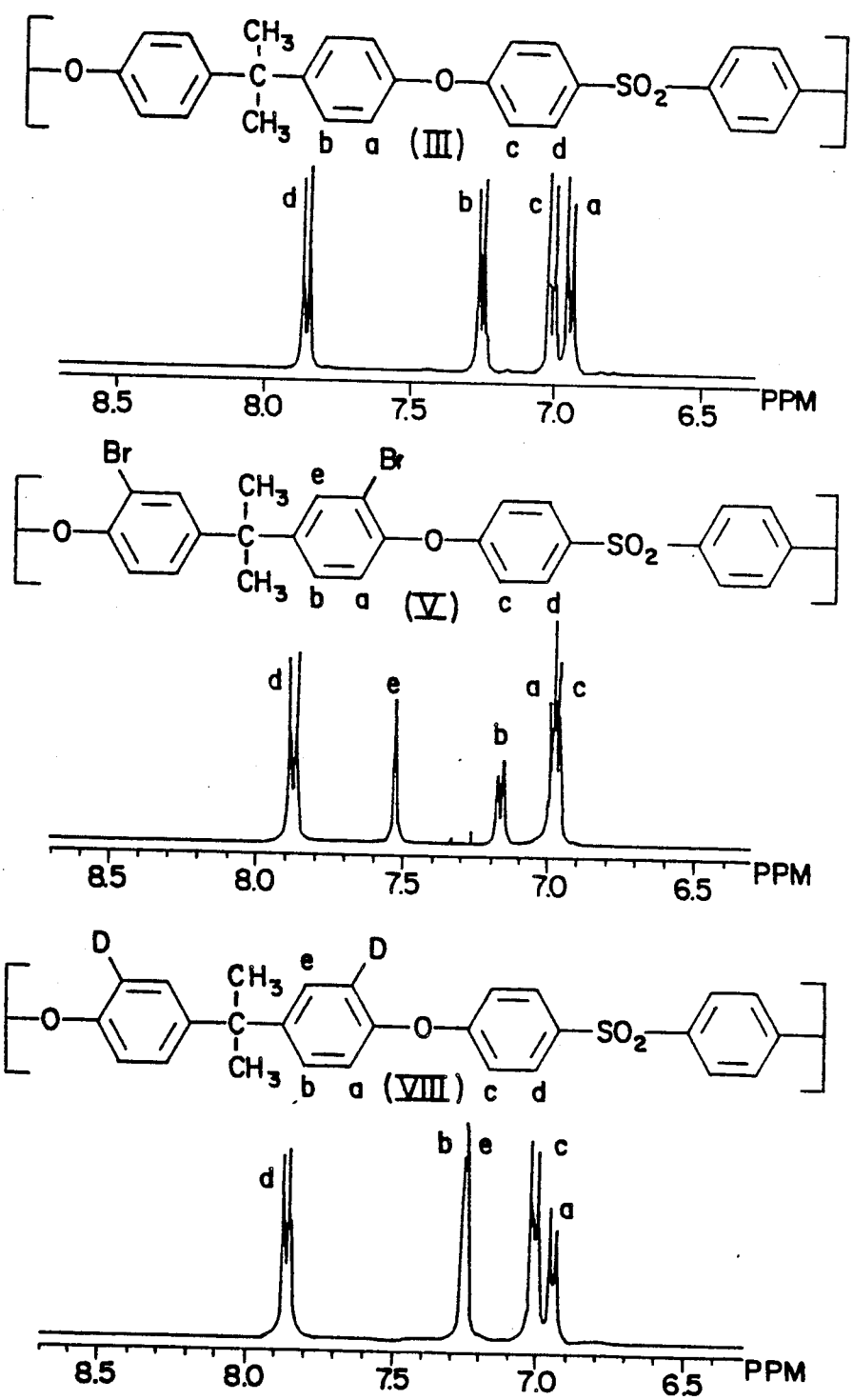

United States Patent [19]

Guiver et al.

[11] Patent Number: 4,999,415
[45] Date of Patent: Mar. 12, 1991

[54] AROMATIC POLYSULFONE COMPOUNDS AND THEIR MANUFACTURE

[75] Inventors: Michael D. Guiver, Ottawa; Oleh Kutowy, North Gower, both of Canada

[73] Assignee: National Research Council of Canada/Conseil de Recherches Canada, Ottawa, Canada

[21] Appl. No.: 281,042

[22] Filed: Dec. 7, 1988

[30] Foreign Application Priority Data

Dec. 11, 1987 [CA] Canada .................................. 554119

[51] Int. Cl.[5] .................... C08G 75/00; C08F 283/00; C08L 81/00
[52] U.S. Cl. .................................. 528/171; 528/174; 525/534; 525/537
[58] Field of Search ................ 525/534, 537; 528/171, 528/174

[56] References Cited

U.S. PATENT DOCUMENTS 4,797,457 1/1989 Guiver et al. .................... 525/534

OTHER PUBLICATIONS

"The Metalation of Diaryl Sulfones", W. E. Truce and M. F. Amos, Journal of American Chem. Society, vol. 73, pp. 3013-3017, 1951.

"2-Chloro-3-dimethylamino-6-phenylsulfonylphenyl-lithium", H. E. Zieger & G. Wittig, Journal Org. Chem., vol. 27, 3270-3273, 1962.

"Reaccion de Intercambio Hidrogeno-Metal Entre 4,4'-Difluordifenil Sulfona Y n-BuLi. I. Efecto Competitivo de los Grupos Fluor Y Sulfona por la Posicion de Metalacion", M. C. Brinon et al., An. Assoc. Quim. Argentina, vol. 69, pp. 70-77, 1981.

Primary Examiner—John Kight, III
Assistant Examiner—P. Hampton-Hightower

[57] ABSTRACT

This invention relates to aromatic polysulfone compounds and their manufacture. More particularly, this invention relates to functional group containing aromatic polysulfones, and their manufacture by metalation with organo-lithium compounds, of halogenated (e.g. brominated or chloromethylated) aromatic polysulfone compounds. The degree of halogenation of the starting material determines the sites that may be metalated, and the degree of metalation determines how many of these sites will be metalated. At least one of the metalated sites may be treated with an electrophile so that the lithium at that site is replaced by a residuum of the electrophile.

9 Claims, 2 Drawing Sheets

AROMATIC POLYSULFONE COMPOUNDS AND THEIR MANUFACTURE

Polysulfones are a class of high performance thermoplastics which have excellent mechanical properties, thermal and oxidative stability and high glass transition temperatures. Their synthesis and properties are disclosed by R. N. Johnson et al in U.S. Pat. No. 4,108,837 (1978) and in Journal of Polymer Science A-1, Vol. 5, 2375-2398 (1967). This class of polymers is useful for the production of molded articles and for the preparation of film and fibre products where excellent mechanical, thermal and chemical stability are required.

It is desirable to manufacture polysulfone compounds which contain functional groups that are able to modify or improve these properties. The introduction of functional groups into polysulfones by chemical modification is well known to induce significant changes in physical properties. For example, the sulfonation of polysulfone, taught by J. P. Quentin, U.S. Pat. No. 3,709,841 (1973), results in a polymer containing sulfonic acid or sulfonate groups which has the modified properties of increased hydrophilicity and increased glass transition temperature and which are useful for the fabrication of porous membranes. Other means of introducing specific functional groups by chemical modifications are also known. The halogenation of polysulfone compound, disclosed by M. D. Guiver et al in co-pending U.S. patent application Ser. No. 07/281,041 filed Dec. 7, 1988, results in polysulfone compounds containing up to two bromine or chlorine atoms per repeat unit bonded covalently to the aromatic nucleus of the bisphenol portion of the polymer. The chloromethylation of polysulfone, disclosed by W. H. Daly in Journal of Macromolecular Science-Chemistry, A22, p 713-728 (1985) results in polysulfones containing chloromethyl groups bonded at the same site. A versatile method of modification has also been disclosed by M. D. Guiver et al in co-pending U.S. patent application Ser. No. 923,211, filed Oct. 27, 1986, now U.S. Pat. No. 4,797,457, 1/10/89 "Preparation of Substituted Polysulfones by Metalation" whereby polysulfone compounds undergo metalation and are then reacted with one of a variety of electrophiles. This results in polysulfone compounds containing one of a choice of several functional groups covalently bonded to the aryl-sulfone portion of the polymer and containing up to three functional groups per repeat unit.

There is a need for other functional groups containing polysulfones and a method for their manufacture, particularly in the fabrication of films and membranes where the presence of a functional group will impart favorable adsorption characteristics.

According to the present invention there is provided a method of manufacturing aromatic polysulfone compounds, comprising, lithiating, by adding at a temperature less than about 0° C. and in an inert, anhydrous atmosphere, an organo-metallic compound of lithium to a solution comprising a polysulfone compound "and an anhydrous solvent therefor, the polysulfone compound" having repeat units of the general formula I:

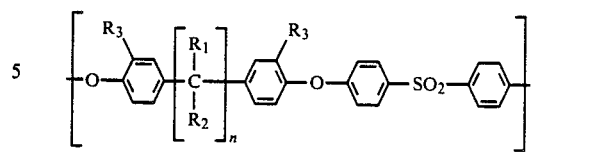

wherein n is one or zero, and when n is one, $R_1$ and $R_2$ each represent alkyl or aryl groups, at least one $R_3$ per polymer chain being selected from the group consisting of bromine and chlorine with any remaining "$R_3$ being hydrogen, and (b) continuing the lithiation so as to form a lithiated compound having repeat units of the general formula II:".

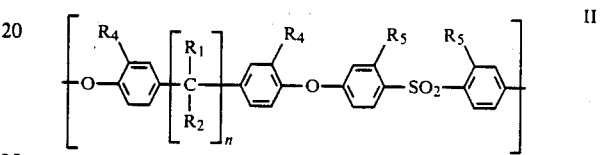

wherein n, $R_1$ and $R_2$ are as previously defined, and, depending on the degree of lithiation, at least one $R_4$ per polymer chain is lithium and is produced from the $R_3$ at that site by metal-halogen exchange to be a lithiated carbanion, any remaining $R_4$ being the previously defined $R_3$ at that site, and, if the degree of lithiation is such that a predominant number of $R_3$ are lithiated by the metal-halogen exchange, and the lithiation is continued, at least one $R_5$ per polymer chain is lithium produced from lithium-hydrogen exchange at that site to be a lithiated carbanion.

The method may further include treating the lithiated polymer with a reactive electrophile until at least one of the said lithiated carbanions per polymer chain are replaced by a residuum of the electrophile.

The reactive electrophile may be at least one substance selected from the group consisting of aldehydes, ketones, isocyanates, disulfides, nitriles, dioxides, organic iodides, organic bromides, organic chlorides, organometallic halides, amides and halogens.

The organo-metallic compound may be selected from the group consisting of alkyl lithiums, aryl lithiums and lithium amides.

The organo-metallic compound may be selected from the group consisting of butyllithium, ethyllithium, methyllithium, phenyllithium, lithium amide and lithium diisopropylamide.

The reactive electrophile may be at least one substance selected from the group consisting of acetaldehyde, benzaldehyde, benzophenone, methylethylketone, phenylisocynanate, dimethyldisulfide, acetonitrile, benzonitrile, carbon dioxide, sulfur dioxide, deuterium oxide, methyl halides, allyl halides, benzyl halides, trimethylsilyl chloride, dimethylacetamide and iodine.

Further, according to the present invention there is provided an aromatic polysulfone compound having repeat units of the general formula II:

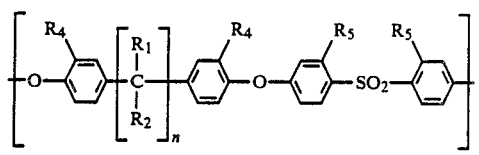

wherein n is one or zero, and when n is one, $R_1$ and $R_2$ each represent alkyl or aryl groups, at least one $R_4$ per polymer chain is a substance selected from the group consisting of lithium and a residuum of an electrophile that has reacted with a lithiated carbanion site and any other than the said at least one $R_4$ is a substance selected from the group consisting of bromine, chlorine and hydrogen, and (i) if a predominant number of $R_4$ per polymer chain are selected from the group consisting of bromine, chlorine and hydrogen, each $R_5$ is hydrogen, and (ii) if a predominant number of $R_4$ per polymer chain are selected from the group consisting of lithium and a residuum of an electrophile that has been reacted with a lithiated carbanion site, each $R_5$ is a substance selected from the group consisting of hydrogen, lithium and a residuum of an electrophile that has been reacted with a lithiated carbanion site.

The residuum may be of an electrophile selected from the group consisting of aldehydes, ketones, isocyanates, disulfides, nitriles, dioxide, organic iodides, organic bromides, organic chlorides, organometallic halides, amides and halogens.

The residuum may be of an electrophile selected from the group consisting of acetaldehyde, benzaldehyde, benzophenone, methylethylketone, phenylisocyanate, dimethyldisulfide, acetonitrile, benzonitrile, carbon dioxide, sulphur dioxide, benzyl halides, trimethylsilyl chloride, dimethylacetamide and iodine.

In some of the following tests certain polysulfones were halogenated in accordance with the applicants' co-pending U.S. patent application Ser. No. 07/281,041, filed Dec. 7, 1988, "A Method of Manufacturing Halogenated Aromatic Polysulfone Compounds and the Compounds so Produced" to provide starting materials for metalation according to the present invention.

Figure 2:
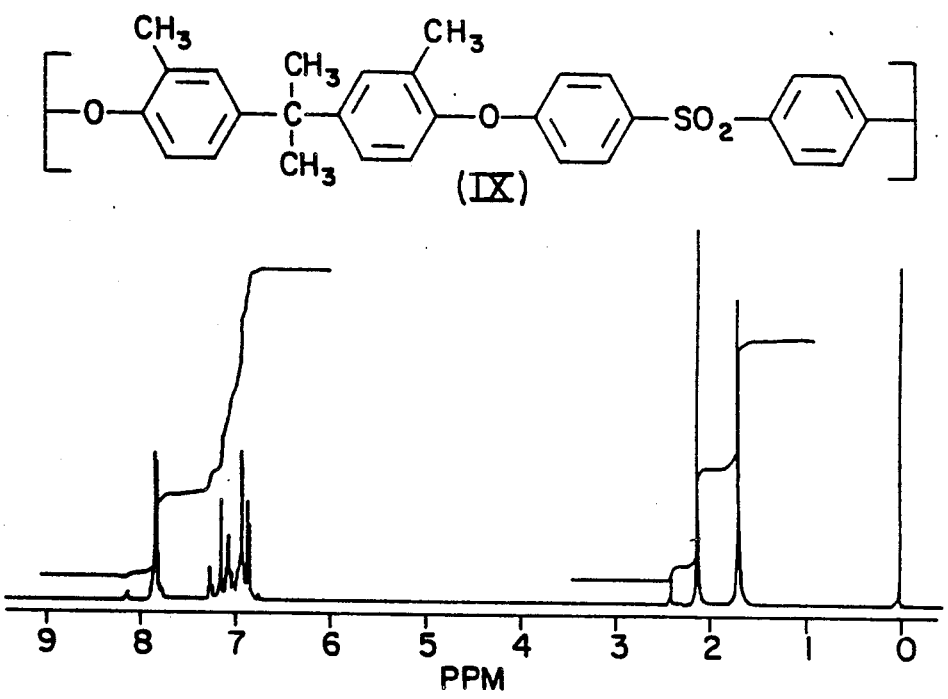

In the accompanying figures which illustrate, by way of example, starting materials, embodiments and uses of the present invention, FIG. 1 shows the NMR spectrum (aromatic region) of dibrominated polymer compared with unmodified Udel (trademark) polysulfone, as well as a dideuterated product derived from the dibrominated polymer, and FIG. 2 shows the NMR spectrum of dimethylated polymer IX derived from Udel by lithiation/methylation.

In some of the following tests to verify the present invention; Udel polysulfone of the formula III,

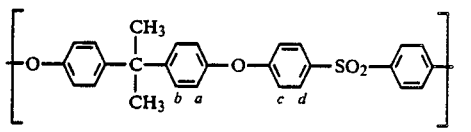

hereinafter referred to as Udel polysulfone III, and Radel (trademark) polysulfone of the formula IV,

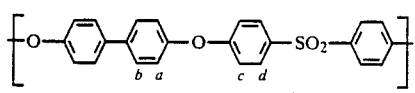

hereinafter referred to as Radel polysulfone IV, were halogenated in accordance with the applicants' co-pending application to provide starting materials for metalation according to the present invention.

The following tests were carried out to verify the present invention.

Lithiation reactions were performed in dried glassware under an inert anhydrous atmosphere of argon or nitrogen. Anhydrous solvent tetrahydrofuran (THF) was prepared by distillation from lithium aluminum hydride prior to the reaction. n-Butyllithium was obtained commercially and was used as received. The functional group polysulfone derivatives were analysed by infrared (IR) spectrometry, elemental analysis and by proton nuclear magnetic resonance spectroscopy (NMR) of deuterochloroform solutions using a Bruker AM-400 400 MHz machine. Signals are designated: broadened (br.), singlet(s.), doublet(d.) and multiplet (m.).

TEST I

Bromination of 'Udel Polysulfone' at Room Temperature

Bromine (11.0 g, 0.0687 mol) was added to a stirred solution of Udel polysulfone III (11.05 g, 0.025 mol) in chloroform (60 mL) at room temperature in an inert atmosphere in the form of argon gas. White clouds of hydrogen bromide soon began to evolve. The mixture was stirred at room temperature for 24 hours and then precipitated into methanol. The recovered dibrominated polymer V was left standing in fresh methanol to leach out residual free bromine, and it was then filtered and dried in a vacuum oven at 40° C. Yield = 15.00 g (100%). Intrinsic viscosity $[\eta]=0.28$. Samples for elemental analysis were prepared by precipitation of a filtered chloroform solution of polymer.

The polymer had repeat units of the formula V,

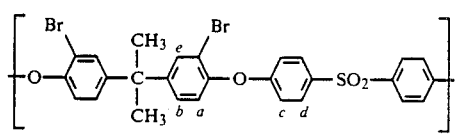

Elemental analysis: calculated for $C_{27}H_{20}SO_4Br_2$

| | Calculated | Found |
| --- | --- | --- |
| C | 54.02% | 53.06% |
| H | 3.36% | 3.25% |
| Br | 26.62% | 27.55% |

NMR: $\delta=7.87$ H-d (4H d. J≈8.8), $\delta=7.52$ H-e (2H d. J≈2.0), $\delta=7.16$ H-b (2H dd. J≈2.0), $\delta=6.97$ H-a (d. J≈8.3), $\delta=6.96$ H-c (d. J≈8.8), $\delta=1.69$ $CMe_2$ (6H s.)

TEST II

Chlorination of 'Udel Polysulfone'

Chlorine gas was bubbled into a solution of Udel polysulfone III (44.2 g, 0.10 mol) in chloroform (250 mL) at 40° C. for 150 minutes. During this time, the evolution of acidic hydrogen chloride gas was shown by moist indicator paper. The dichlorinated polymer VI was recovered by precipitation into methanol, washed and then dried at room temperature in a vacuum. A sample for elemental analysis was prepared by reprecipitation of a filtered THF solution of polymer. The dichlorinated polymer was brittle and has a low intrinsic viscosity. [η]=0.13.

The polymer had repeat units of the formula VI,

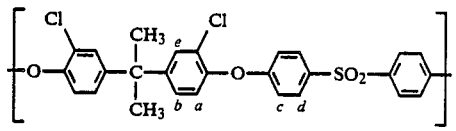

Elemental analysis: calculated for C₂₇H₂₀SO₄Cl₂

|   | Calculated | Found  |
|---|------------|--------|
| C | 63.41%     | 63.57% |
| H | 3.94%      | 4.02%  |
| S | 6.27%      | 6.19%  |
| Cl| 13.86%     | 14.04% |

NMR: δ=7.87 H-d (4H d.), δ=7.36 H-e (br.s.), δ=7.25 (d.), δ=7.13 H-b (br.d.), δ=7.01 H-a (br.d.), δ=6.96 H-c (d.), δ=1.70 CMe₂ (6H s.).

TEST III

Bromination of 'Radel Polysulfone'

Bromine (3.0 mL, 0.058 mol) was added to a solution of Radel polysulfone IV (4.00 g, 0.01 mol) in chloroform (50 mL). Hydrogen bromide gas evolution began soon after the mixture was brought to reflux temperature. After stirring for 18 hours at reflux the mixture was cooled and a slurry of polymer solution separated out. The supernatant was discarded and the dibrominated polysulfone VII was recovered by precipitation into methanol. Excess free bromine was leached out by allowing the polymer to stand in methanol. The dibrominated polymer was purified for elemental analysis by two reprecipitations of chloroform solutions into methanol and then dried under vacuum. The polymer had repeat units of the formula VII,

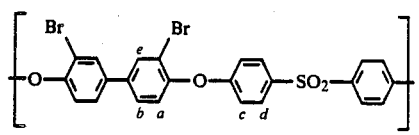

Elemental analysis: calculated for C₂₄H₁₄SO₄Br₂

|   | Calculated | Found  |
|---|------------|--------|
| C | 51.63%     | 51.37% |
| H | 2.53%      | 2.68%  |
| S | 5.74%      | 5.88%  |
| Cl| 28.63%     | 28.86% |

NMR: δ=7.91 H-d (4H d.), δ=7.87 H-e (2H br.s.), δ=7.52 H-b (2H br.d.), δ=7.14 H-a (2H d.), δ=7.02 H-c (4H d.)

The following tests IV to XI were made to produce aromatic polysulfone compounds according to the present invention using the polysulfone compounds obtained by Tests I to III as starting materials.

TEST IV

Lithiation/Deuteration of Dibrominated 'Udel Polysulfone' n-Butyllithium (0.0105 mol, 10.5M) was added dropwise to a stirred solution of dibrominated polysulfone V (3.00 g, 0.005 mol) in THF (75 mL) at −78° C. The clear red solution was stirred for 30 minutes before a solution of D₂O in the THF was added. The resulting dideuterated polymer solution was precipitated into methanol, washed in methanol and dried under vacuum. [η]=0.47. The dideuterated polymer contained repeat units of the formula VIII,

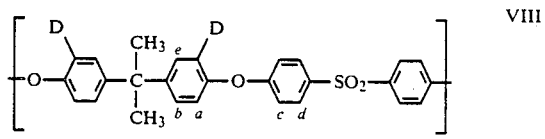

NMR: δ=7.85 H-d (4H d.), δ=7.24 H-b and H-e (4H m.), d=7.00 H-c (4H d.), δ=6.94 H-a (2H d.), δ=1.69 CMe₂ (6H s.).

TEST V

Lithiation/Methylation of Dibrominated 'Udel Polysulfone' n-Butyllithium (0.0105 mol, 10.5M) was added dropwise to a stirred solution of dibrominated polysulfone V (3.00 g, 0.005 mol) in THF (75 mL) at −78° C. The clear red solution was stirred for 30 minutes before excess iodomethane was added. The dimethylated polymer was recovered by precipitation of the solution into methanol. The product was washed in methanol and then dried under vacuum. The dimethylated polymer contained repeat units mainly of the formula IX,

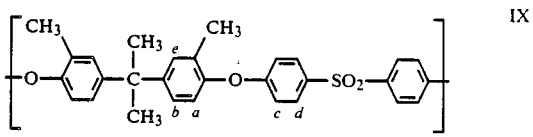

NMR: δ=8.12 and 7.77 H-ortho-sulfone (minor d.'s), δ=7.83 (d.), δ=7.25 (minor d.), δ=7.13 H-e (br.s.), δ=7.06 H-b (br.d.), δ=7.01 (minor d.), δ=6.91 H-c (d.), δ=6.84 H-a (d.), δ=2.40 Me (minor s.), δ=2.11 Me (s.), δ=1.68 CMe₂ (s.).

TEST VI

Lithiation/Methylation of Dibrominated 'Udel Polysulfone' n-Butyllithium (0.022 mol, 10.5M) was added dropwise to a mechanically stirred solution of dibrominated polysulfone V (3.00 g, 0.005 mol) in THF (75 mL) at −78° C. During the addition a clear red gel formed initially, followed by a purple precipitate. The mixture was stirred for 30 minutes before excess iodomethane was added. The methylated polymer product was recovered by precipitation of the solution into alcohol. The NMR spectrum revealed a polymer product of the general formula II where n=1, R₁=R₂=methyl, $R_4$=methyl and $R_5$=methyl (55%) and hydrogen (45%).

From this test it will be seen that the lithiation of halogenated compounds, according to the present invention, having repeat units of the previously defined general formula I, depends on the degree of lithiation, which is controlled by the amount of the organo-metallic compound of lithium used in proportion to that of the polysulfone compound to be lithiated. It should also be noted that lithiation of $R_3$ occurs preferentially. Thus, in the lithiated product of the general formula II, at least one $R_4$ per polymer chain is lithium and is produced from the $R_3$ at that site by metal-halogen exchange to be a lithiated carbanion, any remaining $R_4$ being previously defined $R_3$ at that site, and, if the degree of lithiation is such that a predominant number of $R_3$ are lithiated by the metal-halogen exchange, and the lithiation is continued, at least one $R_5$ per polymer chain is lithium produced from lithium-hydrogen exchange at that site to be a lithiated carbanion.

TEST VII n-Butyllithium (0.0026 mol, 2.6M) was added dropwise to a stirred solution of dibrominated polysulfone V (1.50 g, 0.0025 mol) in THF (50 mL) at −78° C. The brownish solution was stirred for 30 minutes and then carbon dioxide gas was bubbled into the solution. The resulting whitish precipitate was added to isopropanol and the polymer was recovered after washing and then drying in a vacuum oven at 50° C. The yield of polymer in the lithium carboxylate form was 1.33 g. The polymer had repeat units of the general formula II where n=1, $R_1=R_2$=methyl, $R_4$=Br ($\approx$80%) and COOLi ($\approx$20%), R=H ($\approx$97%) and COOLi ($\approx$3%).

Elemental Analysis: C=54.78%, H=2.83%, Br=19.17%. Methyl Ester: A chloroform soluble methyl ester derivative was prepared for NMR analysis. Chloromethane gas was bubbled into a solution of polymer (0.5 g) in DMSO (5 mL) at 100° C. for 30 minutes. The solution was precipitated into methanol, washed and then dried to yield 0.48 g of esterified polymer.

NMR: $\delta$=7.86 H-ortho-sulfone (d.), $\delta$=7.52 H-ortho-carboxyl (s.), $\delta$=7.36 (d.), $\delta$=7.24 (d.), $\delta$=7.16 (d.), $\delta$=6.96 H-ortho-ether (m.), $\delta$=3.90 COOCH$_3$-ortho-sulfone (0.07 CH$_3$, s.), $\delta$=3.72 COOCH$_3$-ortho-ether (0.36 CH$_3$, s.), $\delta$=1.75 and 1.72 CMe$_2$ (6H, s.'s)

TEST VIII n-Butyllithium (0.0052 mol, 2.6M) was added dropwise to a stirred solution of dibrominated polysulfone V (1.50 g, 0.0025 mol) in THF (50 mL) at −78° C. Benzaldehyde (1.0 mL) was added to the brownish solution after 30 minutes and the resulting whitish gel-like precipitate was poured into isopropanol. The hydroxylated polymer was recovered following washing and then drying in a vacuum oven. Yield=1.36 g. The polymer had repeat units of the general formula II where n=1, $R_1=R_2$=methyl, $R_4$=Br ($\approx$60%) and phenyl-CHOH ($\approx$40%) and $R_5$=H (>95%) and phenyl-CHOH (<5%). IR (film): 3495 cm$^{-1}$ (OH stretch) NMR: $\delta$=7.83 (br.s.), $\delta$=7.69 (br.s.), $\delta$=7.58 (s.), $\delta$=7.51 (d.), $\delta$=7.13 (m.), $\delta$=6.95 (d.), $\delta$=6.76 (m.), $\delta$=5.93 (br.s.), $\delta$=2.51 (br.s.), $\delta$=1.70, 1.69 and 1.59 CMe$_2$ (s.'s).

TEST IX n-Butyllithium (0.01 mol, 2.6M) was added to dibrominated polysulfone V (1.50 g, 0.0025 mol) in THF (50 mL) at −78° C. A reddish precipitate formed, to which dimethyldisulfide was added after 30 minutes. After one hour of stirring, the solution was precipitated into methanol and the polymer was recovered in the usual manner. Yield was 1.05 g. The polymer had repeat units of the general formula II, where n=1, $R_1=R_2$=Methyl, $R_4$=SCH$_3$ and $R_5$=H ($\approx$70%) and SCH$_3$ ($\approx$30%).

Elemental Analysis: C=62.54%, H=4.92%, S=21.79%

NMR: $\delta$=8.27 (d.), $\delta$=8.09 (d.), $\delta$=7.91 (d.), $\delta$=7.84 (d.), $\delta$=7.15 H-ortho-SCH$_3$ (s.), $\delta$=7.05 (m.), $\delta$=6.95 (d.), $\delta$=6.94–6.84 (m.), $\delta$=6.60 (d.), $\delta$=2.35, 2.34, 2.33, 2.31, 2.30 SCH$_3$ (s.'s, 2.60 CH$_3$), $\delta$=1.72 CMe$_2$ (s.).

TEST X n-Butyllithium (0.006 mol, 10.0M) was added to dibrominated polysulfone V (1.50 g, 0.0025 mol) in THF (50 mL) at −78° C. Chlorotrimethylsilane was added to the resulting gel after 30 minutes. The mixture was stirred for 30 minutes at −40° C. and the clear liquid was precipitated into isopropanol. The polymer, which was recovered in the usual manner, has repeat units of the general formula II, where n=1, $R_1=R_2$=methyl, $R_4$=Si(CH$_3$)$_3$ ($\approx$100%) and $R_5$=H ($\approx$82%) and Si(CH$_3$)$_3$ ($\approx$18%).

NMR: $\delta$=7.86 (d.), $\delta$=7.74 (m.), $\delta$=7.38 (br.s.), $\delta$=7.34 (br.s.), $\delta$=7.28–7.19 (m.), $\delta$=6.99 (d.), $\delta$=6.97 (d.), $\delta$=6.91 (m.), $\delta$=6.81–6.77 (m.), $\delta$=1.72 CMe$_2$ (6H, s.), $\delta$=0.34 Si(CH$_3$)$_3$-ortho-sulfone and $\delta$=0.18 & 0.16 Si(CH$_3$)$_3$-ortho-ether

TEST XI n-Butyllithium (0.0033 mol, 10.0M) was added to dibrominated polysulfone V (1.50 g, 0.0025 mol) in THF (40 mL) at −78° C. After 30 minutes, the addition of benzophenone to the red gel caused a pink-red precipitate which was poured into a mixture of isopropanol and water. 1.33 g of hydroxylated polymer was recovered. The polymer had repeat units of the general formula II, where n=1, $R_1=R_2$=methyl, $R_4$=(phenyl)$_2$COH ($\approx$60%) and Br ($\approx$40%), and $R_5$=H ($\approx$5%) and (phenyl)$_2$COH ($\approx$95%). IR (film): 3530 cm$^{-1}$ (OH Stretch)

Elemental Analysis: C=72.75%, H=4.59%, Br=5.26%

NMR: $\delta$=7.84 (m.), $\delta$=7.64 (d.), $\delta$=7.36 (d.), $\delta$=7.15 benzophenone residue (major m.), $\delta$=7.01 (d.), $\delta$=6.92 (m.), $\delta$=6.70 (m.), $\delta$=6.54 (br.s.), $\delta$=4.35 and $\delta$=4.30 OH (s.), $\delta$=1.69 CMe$_2$(s.) and $\delta$=1.54 & 1.36 CMe$_2$ shielded by phenyl substituent (s.'s).

Referring now to the drawings,

Figure I shows the NMR spectrum of dibrominated polysulfone V according to the present invention, compared with the unmodified polymer (aromatic region). The modification site in the Bisphenol-A portion of the polymer is shown by protons ortho- to bromine appearing as a meta-coupled doublet at $\delta$=7.52. The unmodified polymer H-b doublet is replaced by a doublet of doublets at $\delta$=7.16 arising from ortho- and meta-coupling in the dibrominated polymer. The aryl-sulfone portion remains largely unchanged. Although the product had a low viscosity, little or no degradation occurred since the subsequently metalated/deuterated product had a similar viscosity to the original polysulfone.

Deuterated and methylated derivatives were prepared from the elctrophiles deuterium oxide and iodomethane to determine the site of lithiation and hence the site of substitution for other electrophiles in other functional group derivatives.

Dibrominated polysulfone V was metalated with n-butyllithium and the lithiated intermediate was trapped with deuterium oxide. Both the bromine and the ortho-sulfone position are potentially reactive metalation sites; the first by simple metal-halogen exchange and the second by metal-hydrogen exchange. A substantial amount of competition between these two reactions might be expected. However, the NMR spectrum of the dideuterated polysulfone derivative also shown in Figure I shows that metal-halogen exchange is the predominant reaction, with a minimal amount of metal-hydrogen exchange evident in this derivative. The arylsulfone doublets remain unaltered while the Bisphenol-A proton signals show dideuteration ortho- to oxygen by the H-b/H-e multiplet and the diminution of the doublet H-a.

The structure of dimethylated polysulfone IX obtained by dilithiation and subsequent methylation with iodomethane of dibrominated polymer, also confirmed that metal-halogen exchange occurs preferentially. However, the NMR spectrum of this derivative, shown in FIG. 2, provides evidence for a small degree of competitive ortho-lithiation. The two major doublets at $\delta=7.83$ and $\delta=6.91$ correspond to the aryl-sulfone portion of the polymer. A broadened singlet at $\delta=7.13$ arises from protons ortho- to the methyl groups. The remaining H-b and H-a protons appear as a broadened doublet at $\delta=7.06$ and a doublet at $\delta=6.84$ respectively. A small percentage of repeat units containing methyl groups ortho- to the sulfone linkage have obvious signals at $\delta=8.12$ & $\delta=7.77$ (ortho-sulfone), $\delta=7.25$ (H-b) and at $\delta=7.00$ (H-a).

The degree of metalation at the bromine atom was 1.60, and at the ortho-sulfone site was 0.18. This was measured by integration of the singlets at $\delta=2.11$ and $\delta=2.40$ respectively.

Preferred Reaction Conditions

The tests have shown that best results for lithiation are obtained at temperatures below 0° C., using THF as the solvent, in an inert (e.g. nitrogen or argon), dry atmosphere.

We claim:

1. A method of manufacturing aromatic polysulfone compounds, comprising,
   (a) lithiating, by adding at a temperature less than about 0° C. and in an inert, anhydrous atmosphere, an organo-metallic compound of lithium to a solution comprising a polysulfone compound and an anhydrous solvent therefor, the polysulfone compound having repeat units of the general formula:

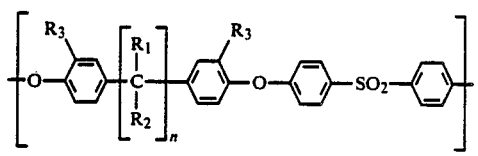

wherein n is one or zero, and when n is one, $R_1$ and $R_2$ each represent alkyl or aryl groups, at least one $R_3$ per polymer chain being selected from the group consisting of bromine and chlorine with any remaining $R_3$ being hydrogen, and (b) continuing the lithiation so as to form a lithiated compound having repeat units of the general formula:

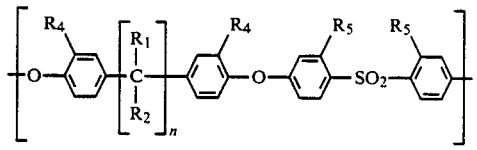

wherein n, $R_1$ and $R_2$ are as previously defined, and, depending on the degree of lithiation at least one $R_4$ per polymer chain is lithium and is produced from the $R_3$ at that site by metal-halogen exchange to be a lithiated carbanion, any remaining $R_4$ being the previously defined $R_3$ at that site, and, if the degree of lithiation is such that a predominant number of $R_3$ are lithiated by the metal-halogen exchange, and the lithiation is continued, at least one $R_5$ per polymer chain is lithium produced from lithium-hydrogen exchange at that site to be a lithiated carbanion.

2. A method according to claim 1, further comprising treating the lithiated polymer with reactive electrophile until at least one of the said lithiated carbanions per polymer chain are replaced by a residuum of the electrophile.

3. A method according to claim 2, wherein the said reactive electrophile is at least one substance selected from the group consisting of aldehydes, ketones, isocyanates, disulfides, nitriles, dioxides, organic iodides, organic bromides, organic chlorides, organometallic halides, amides and halogens.

4. A method according to claim 1, wherein the said organo-metallic compound is selected from the group consisting of alkyl lithiums, aryl lithiums and lithium amides.

5. A method according to claim 1, wherein the said organo-metallic compound is selected from the group consisting of butyllithium, ethyllithium, methyllithium, phenyllithium, lithium amide and lithium diisopropylamide.

6. A method according to claim 2, wherein the said reactive electrophile is at least one substance selected from the group consisting of acetaldehyde, benzaldehyde, benzophenone, methylethylketone, phenylisocyanate, dimethyldisulfide, acetonitrile, benzonitrile, carbon dioxide, sulfur dioxide, deuterium oxide, methyl halides, allyl halides, benzyl halides, trimethylsilyl chloride, dimethylacetamide and iodine.

7. An aromatic polysulfone compound having repeat units of the general formula:

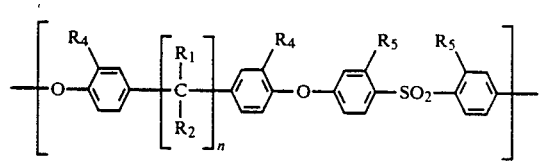

wherein n is one or zero, and when n is one, $R_1$ and $R_2$ each represent alkyl or aryl groups, at least one $R_4$ per polymer chain is a substance selected from the group consisting of lithium and a residuum of an electrophile that has reacted with a lithiated carbanion site and any other $R_4$ than the said at least one $R_4$ is a substance selected from the group consisting of bromine, chlorine and hydrogen and
  (i) if a predominant number of $R_4$ per polymer chain are selected from the group consisting of bromine, chlorine and hydrogen, each $R_5$ is hydrogen, and
  (ii) if a predominant number of $R_4$ per polymer chain are selected from the group consisting of lithium and a residuum of an electrophile that has been reacted with a lithiated carbanion site, each $R_5$ is a substance selected from the group consisting of hydrogen, lithium and a residuum of an electrophile that has been reacted with a lithiated carbanion site.

8. A compound to claim 7, wherein the residuum is of an electrophile selected from the group consisting of aldehydes, ketones, isocyanates, disulfides, nitriles, dioxide, organic iodides, organic bromides, organic chlorides, organometallic halides, amides and halogens.

9. A compound according to claim 7, wherein the residuum is of an electrophile selected from the group consisting of acetaldehyde, benzaldehyde, benzophenone, methylethylketone, phenylisocyanate, dimethyldisulfide, acetonitrile, benzonitrile, carbon dioxide, sulphur dioxide, benzyl halides, trimethylsilyl chloride, dimethylacetamide and iodine.

* * * * *